(12) United States Patent
Grace et al.

(10) Patent No.: US 6,449,009 B1
(45) Date of Patent: Sep. 10, 2002

(54) IMAGE TRANSFER METHOD FOR TELECINE

(75) Inventors: Paul Grace, Haultwich; Aine Marsland, Northfleet, both of (GB)

(73) Assignee: Pandora International Limited (GB)

( * ) Notice: Subject to any disclaimer, the term of this patent is extended or adjusted under 35 U.S.C. 154(b) by 0 days.

(21) Appl. No.: 08/737,869

(22) PCT Filed: May 19, 1995

(86) PCT No.: PCT/GB95/01135

§ 371 (c)(1),
(2), (4) Date: Jul. 7, 1997

(87) PCT Pub. No.: WO95/32582

PCT Pub. Date: Nov. 30, 1995

(30) Foreign Application Priority Data

May 19, 1994 (GB) ................................. 9410093

(51) Int. Cl.[7] ........................ H04N 5/253; H04N 9/11; H04N 9/47
(52) U.S. Cl. ........................................... 348/97
(58) Field of Search .................. 348/97–105, 107–109; 386/131, 42; H04N 5/253, 9/11, 9/47

(56) References Cited

U.S. PATENT DOCUMENTS

| | | | | |
|---|---|---|---|---|
| 4,514,769 A | * | 4/1985 | Gallo | 348/97 |
| 5,170,154 A | * | 12/1992 | Mead | 348/102 |
| 5,276,522 A | * | 1/1994 | Mead | 348/101 |
| 5,469,209 A | * | 11/1995 | Gunday et al. | 348/96 |
| 5,671,008 A | * | 9/1997 | Linn | 348/97 |
| 5,917,987 A | * | 6/1999 | Neyman | 386/42 |

FOREIGN PATENT DOCUMENTS

| | | | | |
|---|---|---|---|---|
| EP | 0438299 | * | 7/1991 | G11B/27/034 |
| GB | 2244626 | * | 12/1991 | H04N/4/253 |
| GB | 2254518 | * | 10/1992 | G06F/15/68 |

OTHER PUBLICATIONS

High–Resolution Electronic Intermediate System for Motion–Picture Film, B. Hunt, G. Kennel, L. DeMarsh, and S. Kristy, SMPTE Journal, pp. 156–161, Mar. 1991.*

* cited by examiner

Primary Examiner—Nhon Diep
(74) Attorney, Agent, or Firm—McDonnell Boehnen Hulbert & Berghoff

(57) ABSTRACT

A method for transferring images from cinematographic film to video media. The method uses a telecine machine which is associated with a digital storage device and a modification device is used to modify image data during transfer to video media. Accordingly, an operator may select a sequence of frames on the film and modify the image.

6 Claims, 5 Drawing Sheets

IMAGE TRANSFER METHOD FOR TELECINE

Figure 1:
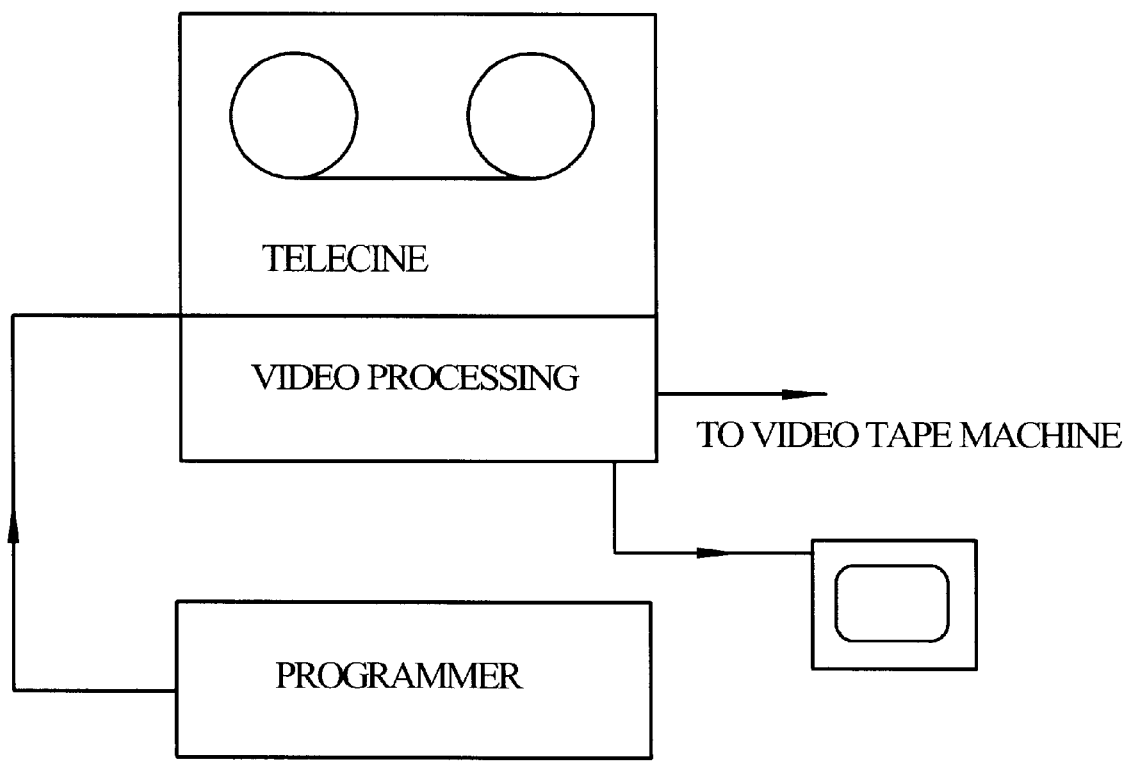

This disclosure relates to image processing and in particular to improving the efficiency or facilities offered in the creative process of transferring film originated material into a TV or Video medium.

Conventionally, the process of film to video transfer is accomplished on a 'Telecine' machine, and a number of additional control and editing systems. Examples of such telecine machines are the Rank Cintel URSA machine, or the BTS FDL 90 machine. Such machine transfer the film to video in 'real time'. This means that a film that has a one hour viewing duration takes one hour to transfer to video. Telecine machines are inevitably very expensive and this is unlikely to be changed by forthcoming technology. This is because of the large amount of precision mechanics necessary to transport film with great stability and without putting undue stress on, or damaging, the film.

Making editorial decisions on the reproduction cannot be accomplished in real time, and thus there exist a number of programmer, machines, which allow decisions to be made in non real time, stored, and replayed in real time. Examples of such programming systems are the POGLE (Trade Mark), available from Pandora International, or the DA VINCI (Trade Mark), from Colorgraphics in Fort Lauderdale, Fla. The technique of 'scene by scene programming' is disclosed in U.S. Pat. No. 4,096,523. In a typical operation, colour grading is carried out. Film resolution material has a much wider range of colours than are used in video material. One task of the programmer is to adjust the colours so that they will be suitable for the video environment. Thus, in one scene there may be a red item whose colour needs to be adjusted for the video material, and the appropriate grading operation will be carried out for that scene.

Such telecine systems usually have a 'reference' store. This allows a comparison between one image and another, quite often on a 'split screen' basis. Such facilities are quite often used to compare the colour consistency of a given object between several scenes.

Extensions to the reference store can be accomplished by techniques disclosed in U.S. Pat. No. 4,857,994. This discloses a method for adding an additional 'still store' to the telecine grading system, and controlling the available images on this still store from the programming system. Examples of such systems are the 'Matchbox' (Trade Mark) system from Rank Cintel Ltd., or the still store from ACCOM, in Menlo Park, Calif. USA.

In a separate series of developments, there now exist a number of systems for the 'non-linear' editing of video material. Typically, video material (normally shot as video, although the systems do not preclude the use of film originated material converted to video on a telecine type system) is digitised, i.e. captured into a digital computer type disc file, compressed, i.e. meaning data compressed by such techniques as the ISO standard JPEG system, and displayed on a low cost video workstation for the purpose of making 'cut' decisions These decisions are stored in a 'cut list' which is eventually applied to the original high quality (non-compressed) material in a process often referred to as 'conforming'. Such non-linear editing systems are available from Lightworks Editing Systems Ltd. of London, or AVID Inc., of Massachusetts USA.

As can be seen from the above, the artistic process entails the use of a number of components, which have evolved over a period of time. Therefore the interfacing of such boxes are non-ideal, and some functions are repeated between systems, whilst other desirable features are missing.

Currently available systems have a 'close coupling' of video around the telecine machine. The programmer to telecine link is a 'control' link, meaning that control data only passes down this link. No true video information is available at the programmer. Reference is made to FIG. 1, which shows a telecine machine with a video processing unit, a programmer and a monitor, and output to a video tape machine.

Figure 2:
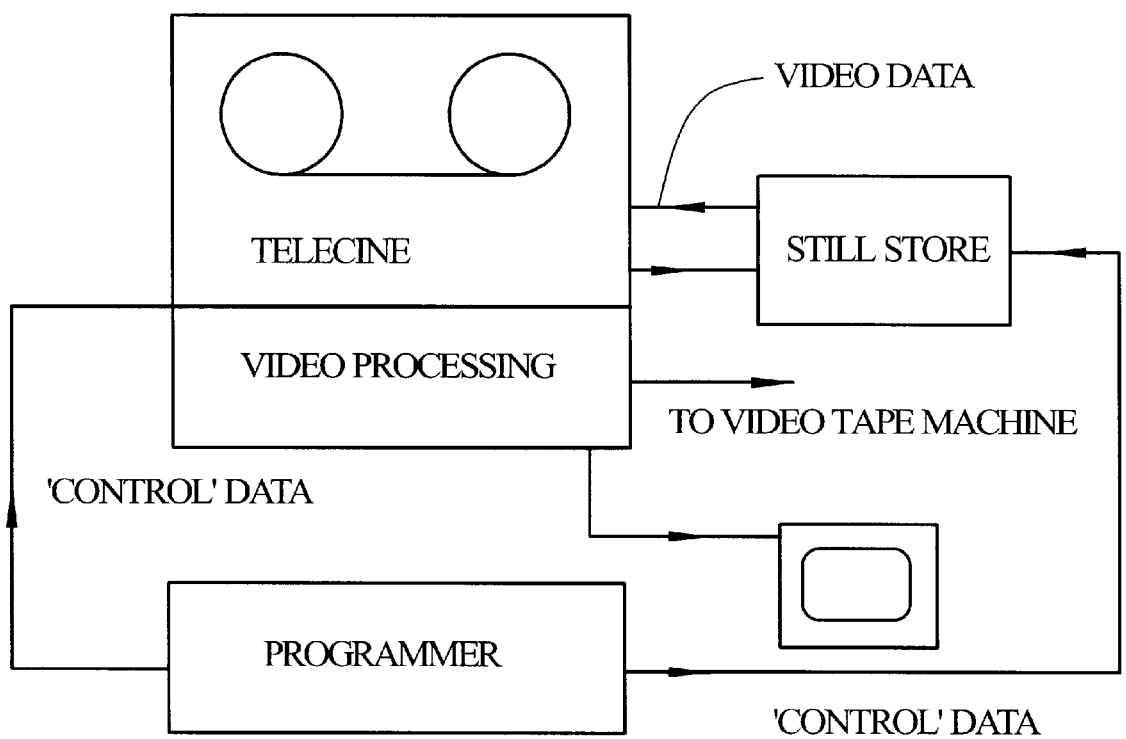

Even for systems where a 'still store' system is employed, there has to be a 'close coupling' between the telecine and the still store. Reference is made to FIG. 2 which shows a telecine machine with a video processing unit, a programmer and a monitor, output to a video tape machine, and a still store which exchange video data with the telecine and receives control data from the programmer.

According to one aspect of the present invention there is provided a method of transferring material from cinematographic film to video media using a telecine machine, in which an operator selects a sequence of frames to be operated upon, the telecine supplies digitised versions of those frames to digital storage means, the operator accesses the digitised versions of the frames on the digital storage means and makes a decision as to modification of the material to be carried out during the transfer from cinematographic film to video media, data corresponding to the decision is created, if desired further sequences of frames are operated upon and the corresponding modification data created, the data corresponding to the or each modification is transmitted to means for modifying the material during transfer from cinematographic film to video media, and the transfer is effected and the material modified.

Viewed from another aspect of the invention there is provided apparatus for transferring material from cinematographic film to video media, comprising a telecine machine, means for modifying the material during transfer from cinematographic film to video media, digital storage means communicating with the telecine machine to receive digitised versions of frames therefrom, a video editing terminal communicating with the digital storage means to receive the digitised versions of the frames, the video editing terminal comprising means for recording data corresponding to operator decisions as to modification of the material, and means for committing the data from the video editing terminal to the means for modifying the material during transfer to video media.

Thus whilst in a conventional telecine the grading system gives 'command' data to the telecine for the execution at the telecine, in a preferred edit the proposed novel architecture here actually transfers the video data to the video workstation for modifying of the data, which is eventually returned back to the telecine 'server'. This server would consist of a control computer, together with storage facilities in the form of large computer discs, and RAM store. These would be filled with 'clips' from the telecine as the telecine transfers data from film into the digital domain. When it is necessary to view a scene again later, this scene will be recalled from the server's store instead of from film. This will create two benefits. The first of these is to minimize film wear. This is important as it is often desired to transfer film that is the "camera original" material, as this can yield the highest possible quality. It is however, irreplaceable unless it is possible to re-film the original action. The second of these benefits is to get maximum utilization from the expensive film scanning part of the telecine, rather than using it to scan the same piece of film again and again.

Physically this 'server' could be a part of the telecine assembly, or could be in a separate room. High speed communication protocols, such as the 'HIPPI' protocol allow data communication at a very high data rate, typically at data rates of up to 120 Megabytes per second.

A further enhancement is the use of more than one video editing terminal with the telecine 'server'. Thus it is possible to get much more efficiency of use from the expensive mechanical transport sections of the telecine system. Whilst one operator is working on one scene, another operator can access another sequence of frames and work on a different scene.

Figure 3:
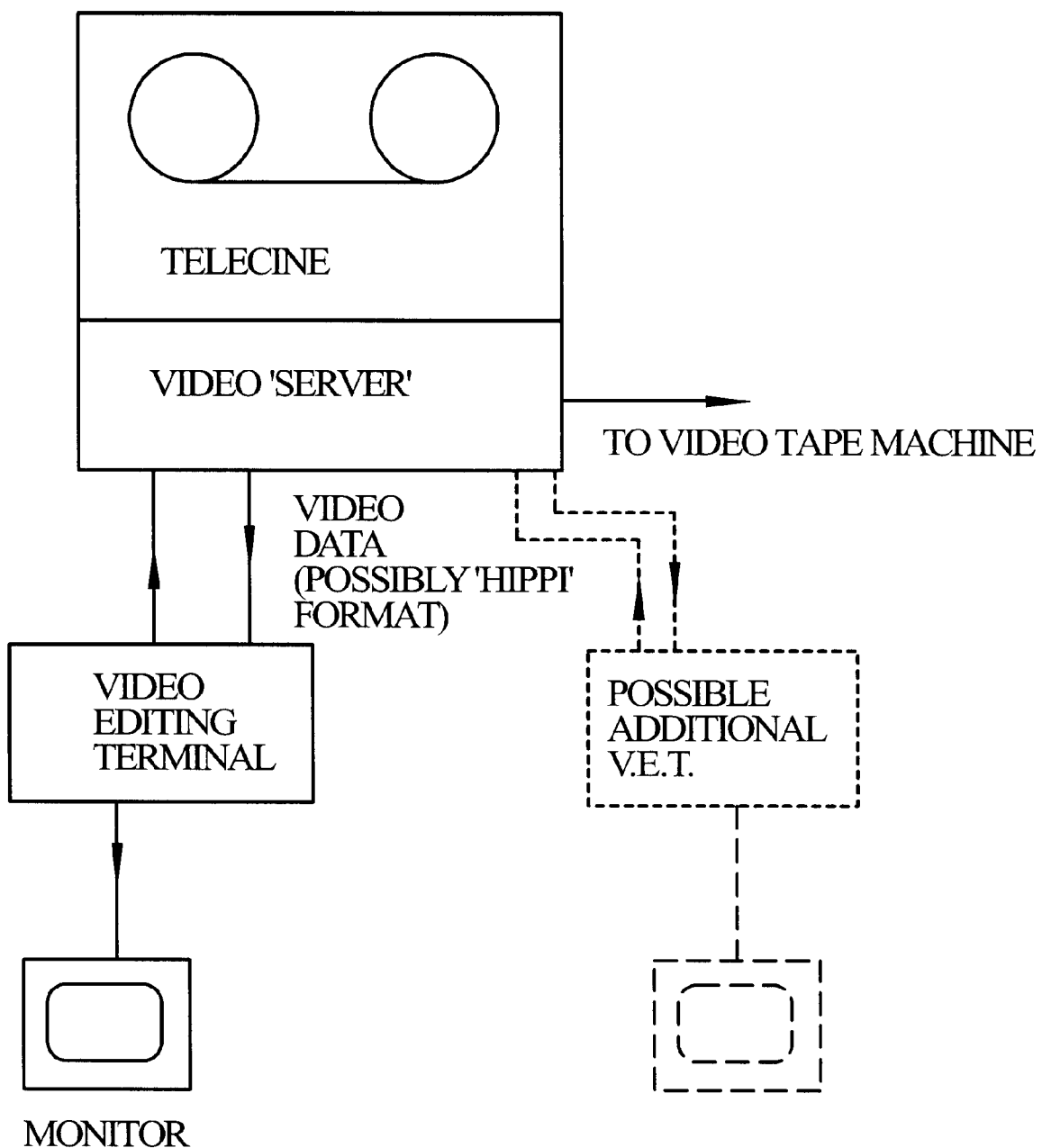

FIG. 3 shows a basic system in accordance with the invention. There is a telecine machine provided with a video server which exchanges data with a video editing terminal, possibly using HIPPI format. There is a monitor for the operator and as before there is eventual output to a video tape machine. A possible additional video editing terminal is shown in outline.

Another enhancement would be to be able to load the server with picture data from other sources. For example, it may be desirable to store on the telecine server image data, from a 3-D rendering system, or from a caption generator for example. Then the video editing terminal can have access to telecine imagery and also to captions and 3-D data for combining with the telecine images.

It is possible to use the video editing terminal to perform 'non linear' editing functions. Compression techniques as used in non-linear editing can be incorporated for cost reduction, although this is not a compulsory feature of the proposed system, as it is in true non-linear editing systems. One inherent disadvantage of conventional non-linear editing is the necessary stage of 'digitising'. This however can be carried out in a novel 'intelligent' manner. Normally digitizing is done as a 'dumb' process. This typically involves conversion from an existing tape format to a 'computer' file format, to which compression algorithms are applied. In the proposed system, the conversion to a computer file format takes place anyway as part of the overall process. The rest of the preparation stage for non-linear editing is to apply the compression stage. This will take place in the creative grading environment as a 'background process'. The system controlling computer will keep a record of all of the scenes of the film. This is readily available from the telecine controller, such as Pandora's POGLE. As each scene is viewed on the telecine (no matter in which order it is viewed) the background conversion will take place, an the system controller will mark that scene as available for 'editing'. As all of the scenes will eventually be viewed (and if they are not viewed, they will obviously not be required for the final production) they will all eventually be converted into 'non-linear' form.

By utilising a 'standard' platform as the video editing terminal, it is possible to easily incorporate standard platform software to further manipulate the resultant imagery. For example, by choosing the video editing terminal to be built around a SILICON GRAPHICS platform, it is possible to run such software as the 'Photoshop' (Trade Mark) package, or other packages such as those available from KODAK (Cineon Software) or PARALLAX Graphics. This would enable a very large number of facilities to be made readily available.

In one arrangement, the proposed system can support a range of video editing terminals, to provide a range of price & performance possibilities. Simple workstations, based on, say, PC architecture, and offering relatively low quality can be used for some applications, whilst much more expensive (and higher quality) workstations can be used for others. It is proposed that the Video Server be able to 'interrogate' the terminals, to identify their requirements for resolutions. Thus it may be that the cheapest of the PC based workstations has a resolution of say, 640×480, but the much higher quality workstation work at 1024×1280. This range of workstation would be independent of the resolution that the film is being scanned at on the telecine. This could be independently either 'standard' TV resolution (typically of the order of 500–600 lines), 'High Definition' resolution (typically 1000–1300 lines) or 'Film' resolution (typically 2000–8000 lines).

The process of colour correction can either be carried out as a purely software function (implemented on the video editing terminal for display purposes, and later reimplemented at the video server resolution later) or by a dedicated hardware module, as is done at present (with the Pandora DCP or similar units). This dedicated hardware module could be used for processing either the 'view' images at the Video Edit terminal, or as a peripheral for the 'Server' to use.

A further implementation of the proposed invention would be to replace the dedicated link between the telecine 'server' arid the Video editing terminal with a long-distance high speed telecommunications link. Such a link may be the ATM (Asynchronous Transfer Mode) protocol. This protocol is specified to run at 150 Mbits per second. This would enable the possibility to have the telecine transport and 'server' on one continent, and the Video Editing terminal on another. This would allow the provision of a 'Global' service. This is particularly relevant to the film to video conversion process, as there are a limited number of high calibre artists for this market. Currently a client may have the telecine transfer done in one country so as to be able to use the artist that they desire, and then have the rest of the processes necessary to produce a finished work carried out in another country which either offers the required range of equipment, or can offer the facilities at the right price. All of the above travelling could be rendered unnecessary.

Figure 4:
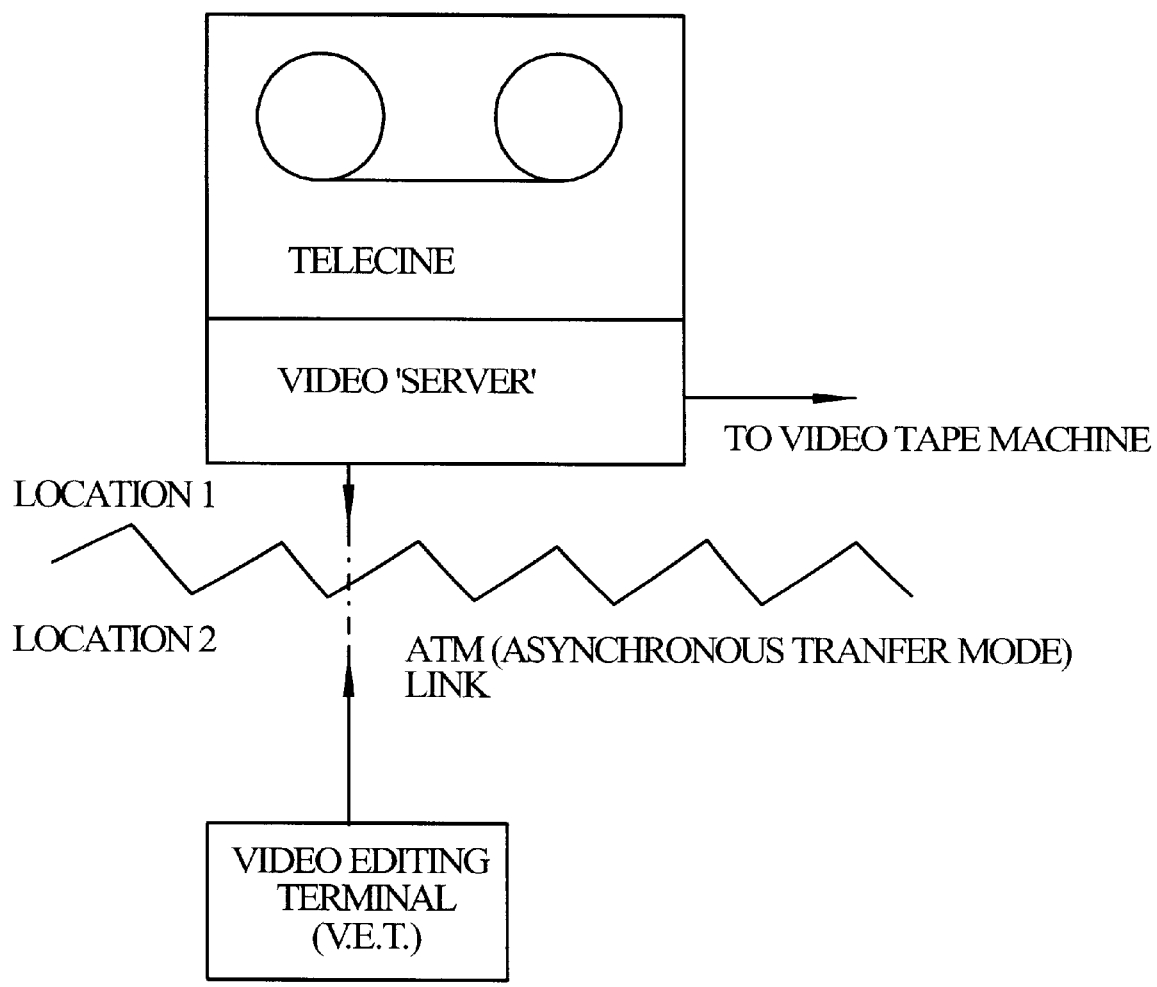

FIG. 4 shows an arrangement for using a remote video editing terminal.

Figure 5:
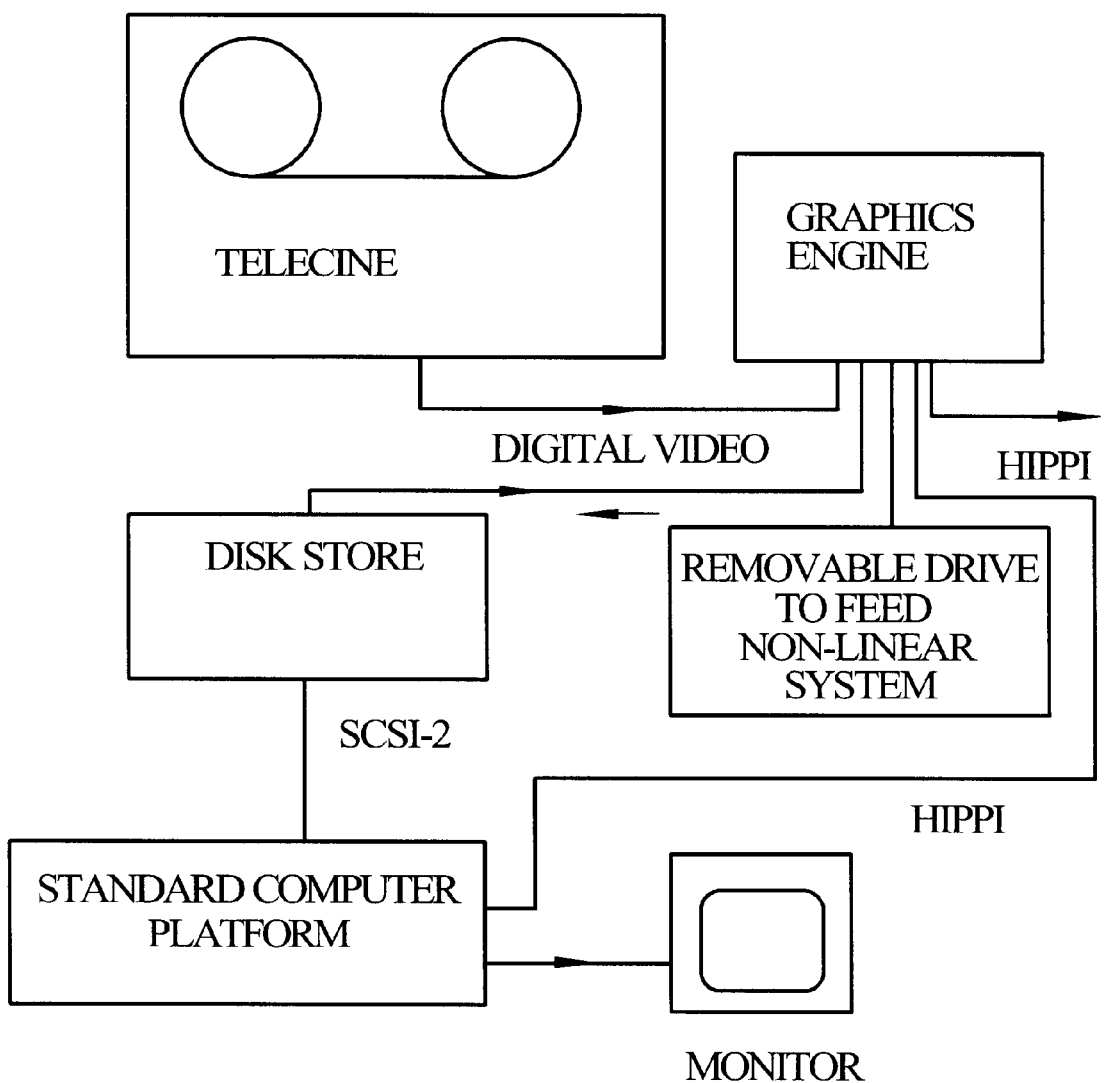

A preferred embodiment of a system for carrying out the invention is shown in FIG. 5.

Thus, a telecine machine provides digital video output to a hardware colour correction graphics engine. This has a port for communication with an external image source, such as standard platform computers, tape drives, scanners etc. using HIPPI, ATM, ETHERNET or SCSI. There is a compressed video output which supplies data to the workstation by a suitable link, the workstation being e.g. a standard platform computer such as a Silicon Graphics indigo (Trade Mark). A VDU monitor is attached to the workstation. In return the workstation communicates with the graphics engine by means of an HIPPI link to download effects. Both the workstation and the graphics engine are linked to a disk store using a SCSI-2 interface. The disk store acts as a segmented image reservoir and server. A soft partition is allocated to stills store use, or to segments of texture such as grain for keying onto output images. Linking the workstation, telecine and graphics engine is a control bus, and between the disk store and the graphics engine there is the transfer of key data. The graphics engine is provided with a removable drive to feed a non-linear system such as AVID (Trade Mark).

In summary therefore, at least in the preferred embodiment there is provided a telecine operation where colour grading or other modifications are to be carried out during transfer from cinematographic film to video media, in which digitised versions of frames are supplied to a terminal where an operator makes decisions as to modification of the material, data representing these decisions is transmitted to means for modifying the material during transfer from film to video media, and the transfer takes place and the material is modified.

What is claimed is:

1. A method for transferring images from cinematographic film to video media using a telecine machine which is associated with a digital storage device and with a modification device to modify image data during transfer to video media, comprising the steps of:

a) an operator selecting a first sequence of frames on the film;

b) scanning the frames in the first sequence in the telecine machine to produce digital image data corresponding to the frames in the first sequence and supplying the digital image data to the digital storage device associated with the telecine machine;

c) supplying the digital image data corresponding to the frames in the first sequence from the digital storage device to a remote video editing terminal;

d) displaying visual representations of the digital image data corresponding to the frames in the first sequence on a monitor associated with the remote video editing terminal;

e) the operator viewing the visual representations on the monitor and making decisions as to modifications to make to the images whilst being transferred from the cinematographic film to the video media, and creating modification data corresponding to the decisions in the remote video editing terminal;

f) the remote video editing terminal recording the modification data, g) whereby whilst the operator views the visual representations of the frames in the first sequence and makes the modification decisions, and the modification data is created and recorded, the telecine machine is made available for frames of a further sequence to be scanned and for digital image data relating to the frames of the further sequence to be supplied to the digital storage device associated with the telecine machine;

h) transmitting the modification data concerning the frames in the first sequence to the modification device to modify the image data during transfer to video media, i) scanning the frames in the first sequence again in the telecine machine and supplying digital image data to the modification device to modify the image data, where the digital image data is modified in accordance with the modification data; and j) creating video media in accordance with the modified image data.

2. A method as claimed in claim 1, wherein a plurality of sequences of frames are selected and scanned, and for each of the sequences of frames the following steps are carried out:

a) scanning the frames in the sequence in the telecine machine to produce digital image data corresponding to the frames in the sequence of frames and supplying the digital image data to the digital storage device associated with the telecine machine;

b) supplying the digital image data corresponding to the frames in the sequence from the digital storage device to a remote video editing terminal;

c) displaying visual representations of the digital image data corresponding to the frames in the sequence on a monitor associated with the remote video editing terminal;

d) viewing the visual representations on the monitor by the operator and making decisions as to modifications which should be made to the images whilst being transferred from the cinematographic film to the video media, and creating modification data corresponding to the decisions in the remote video editing terminal;

e) the remote video editing terminal recording the modification data;

f) transmitting the modification data concerning the frames in all of the sequences to the modification device to modify the image data during transfer to video media;

g) scanning the frames in all of the sequences again in the telecine machine and supplying digital image data to the modification device to modify the image data, where the digital image data is modified in accordance with the modification data; and h) creating video media in accordance with the modified image data.

3. A method as claimed in claim 2, wherein two remote video editing terminals are provided, and the modification data concerning the frames of one sequence is created on one video editing terminal whereby the modification data concerning the frames of another sequence is created on another video editing terminal.

4. A method as claimed in claim 1, wherein the modification of the images includes color grading.

5. A method as claimed in claim 1, wherein image data from an additional source is incorporated with the images.

6. A method as claimed in claim 1, wherein the modification of the images includes editing.

* * * * *